United States Patent [19]
Fujisaki et al.

[11] Patent Number: 4,483,729
[45] Date of Patent: Nov. 20, 1984

[54] METHOD OF MANUFACTURING CONTINUOUS FIBER REINFORCED PLASTIC RIMS

[75] Inventors: Masaru Fujisaki, Tokyo; Tetsuo Tsuchida, Saitama; Yoichi Sasajima, Osaka; Hirohisa Ito, Osaka; Masahiro Morita, Osaka, all of Japan

[73] Assignees: Honda Giken Kogyo Kabushiki Kaisha, Tokyo; Sumitomo Electric Industries, Ltd, Osaka, both of Japan

[21] Appl. No.: 453,863

[22] Filed: Dec. 28, 1982

[30] Foreign Application Priority Data

Jan. 7, 1982 [JP] Japan ................................. 57-1657

[51] Int. Cl.³ .............................................. B31F 23/10
[52] U.S. Cl. ..................................... 156/222; 152/411; 156/224; 156/245; 301/63 PW; 301/95
[58] Field of Search ..................... 156/245, 304.1, 224, 156/304.2, 304.3, 222, 169, 173, 191; 152/396, 399, 402, 411; 301/95, 63 DD, 63 PW

[56] References Cited

U.S. PATENT DOCUMENTS

| 1,049,287 | 12/1912 | Barnett | 152/411 |
| 2,458,761 | 1/1949 | Baker | 152/396 |
| 3,790,219 | 2/1974 | Watts | 301/63 DD |
| 4,173,992 | 11/1979 | Lejeune | 301/95 |
| 4,294,490 | 10/1981 | Woelfel | 301/95 |

FOREIGN PATENT DOCUMENTS

| 2439840 | 2/1976 | Fed. Rep. of Germany | 301/95 |
| 0068403 | 5/1980 | Japan | 301/95 |

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

A wheel rim is formed by separately forming rim halves of fiber sheets arrayed in different directions so that the fibers are isotropic around the circumference of the rim, and by welding the halves together with a ring formed of carbon fibers.

12 Claims, 7 Drawing Figures

METHOD OF MANUFACTURING CONTINUOUS FIBER REINFORCED PLASTIC RIMS

BACKGROUND OF THE INVENTION

This invention relates to a method of manufacturing rims, e.g. for automobiles or motorcycles, by using fiber-reinforced plastic (hereinafter referred to as "FRP", when applicable) which is light and durable. FRP which is provided according to a method in which reinforced fibers such as carbon fibers, glass fibers or Kevlar (a trade mark of DuPont Co.) fibers are impregnated with thermosetting resin such as epoxy resin or polyester resin, is high in strength and elasticity, resistive against acid and alkali, has a high fatigue limit, is lightweight and is excellent in vibration damping characteristics. Thus, such a FRP is being increasingly employed in various applications as a light structural material. In the future, such a FRP may be more extensively applied to automobiles in order to reduce the weight of the automobiles to thereby increase the fuel economy of the automobiles.

SUMMARY OF THE INVENTION

It is an object of this invention to provide a method of manufacturing continuous fiber reinforced plastic rims which are smaller in weight than aluminum alloy rims. It is a feature of this invention that FRP rims are provided having a high volumetric fiber content (hereinafter referred to merely as "Vf", when applicable) and in which continuous fibers are employed to utilize the above-described advantages of the FRP.

According to this invention, opposite halves of a rim each including a flange and bead seat portion are separately fabricated by pressing a plurality of fiber layers, with the fiber layers being laid over one another such that their fibers, extend in different directions. In the case of single-direction fiber layers, the layers are angularly offset by substantially $\pi/n$ radians, where n is the number of layers, whereas for woven layers having orthogonal fibers the angular offset may be substantially $\pi/2n$ radians. The two rim halves are subsequently joined together by a ring of fibers preferably formed by filament winding, the three parts being welded together to form the wheel rim.

BRIEF DESCRIPTION OF THE DRAWINGS

This invention will now be described with reference to the accompanying drawings, in which.

DETAILED DESCRIPTION OF THE PREFERRED EMBODIMENT

Figure 1A:
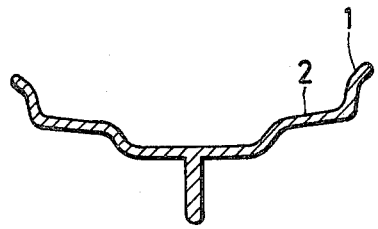
FIGS. 1(a) and 1(b) are sectional views showing typical examples of a conventional rim.
Figure 1B:

FIG. 1 is a sectional view showing the typical example of a conventional rim. Such a rim can be readily made of metal material by machining, pressing and/or welding.

The rim has a flange and a bead seat 2 and 1, respectively, each having a large curvature. Therefore, in the case where FRP is used, it is difficult to mold the FRP in such a manner that the long fibers extend along the curvatures. In order to overcome this difficulty, a molding method using a SMC (sheet molding compound) including short fibers is employed. However, short fibers are much lower in strength and elasticity than continuous fibers and, in order to provide an SMC rim with the same characteristics as a metal rim, it is therefore necessary to increase the wall thickness. Thus, the advantage in lightness of the FRP is lost due to the need to use greater amounts of material.

Figure 2A:
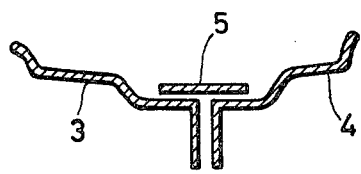
FIGS. 2(a) and 2(b) are sectional views showing examples of an FRP rim according to this invention.
Figure 2B:
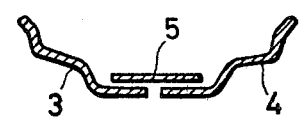

In order to eliminate the above-described drawback and to provide an FRP rim having a high Vf by using continuous fibers, the inventor has developed the following methods. In the method according to this invention, as shown in FIGS. 2(a) and 2(b), the rim comprises a first flange and bead seat part 3 and a second flange and bead seat part 4, and a ring part 5. The parts 3 and 4 are formed by pressing, and the part 5 is formed by filament winding. These parts, after being machined, are assembled together and welded.

Figure 3:
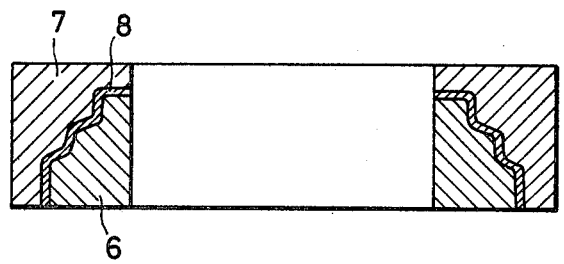
FIG. 3 is an explanatory diagram for a description of a method of manufacturing the right and left flange and bead seat parts of a rim.
Figure 4:
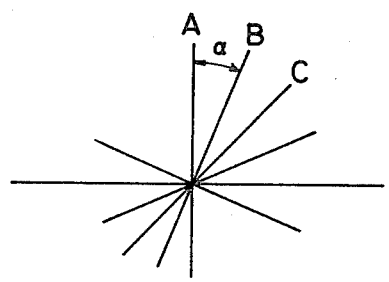
FIG. 4 is an explanatory diagram for a description of a method of laying sheets in which long fibers are extended in a direction such that they overlap substantially isotropically in the circumferential direction.
Figure 5:
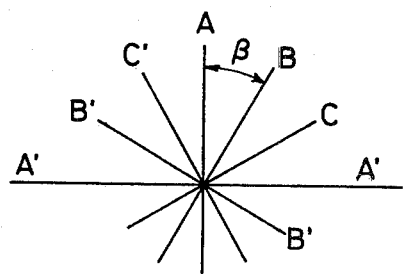
FIG. 5 is an explanatory diagram for a description of a method of laying woven sheets in such a manner that they overlap substantially isotropically in the circumferential direction.

More specifically, the flange and bead seat parts 3 and 4 are formed as follows. First, a die 6 and a punch 7 for pressing are provided as shown in FIG. 3. Sheets each having long fibers impregnated with resin and extended in a certain direction (hereinafter referred to as a "long fiber direction") are laid on the die 6 in such a manner that their long fiber directions are angularly offset with respect to one another by substantially $\pi/n$ radians (n being the number of sheets, at least four), so that the composite fiber layer is substantially isotropic around the circumferential direction of the die, as shown in FIG. 4. In the case where woven sheets are used wherein each sheet includes fibers extending in two orthogonal directions, the sheets are laid in such a manner that their fiber directions are angularly offset with respect to one another by $\pi/2n$ radians (n is the number of sheets, at least two). Thereafter, the punch 7 is placed on the sheets thus laid. Under this condition, the flange and bed seat parts are formed by hot pressing.

In the case where an article such as a rim which is intricately curved is formed by pressing sheets in which fibers are oriented in one direction, the fibers are liable to become irregular in arrangement, which makes it difficult to produce the intended article. However, in employing the method according to the invention in which sheets are laid so as to form a substantially isotropic composite layer, the fibers will remain substantially stationary during pressing due to friction between layers, and accordingly pressing can be achieved by sufficiently extending the fibers along the curves of the flange and bead seat part. The method is especially effective when woven sheets are employed, and the produced article hsa an excellent arrangement of fibers and has a high Vf.

In a concrete example of the invention using carbon fiber woven sheets of torayca cloth #6341, nine woven sheets were laid as described above, to form a rim having a wall thickness of 3 mm. The Vf of the formed rim was 65%, and the weight of the rim was about 40% less than that of an aluminum alloy rim.

In this example the Vf was 65% however, the Vf may range from 50% to 70% by varying the number of sheets to be laid.

Light FRP rims can be manufactured not only according to the above-described method in which only long fiber sheets or woven sheets are used, but also according to a method in which several long fiber sheets or woven sheets are used for the surface layers and laminated materials including short fibers, discontinuous woven sheets or woven sheets which are partially cut are used for the intermediate layer or layers.

Since the ring 5 must be used to satisfactorily join the two right and left flange and bead seat parts 3 and 4 together, it is preferable that the fibers in the ring 5 are oriented at at least 45° with respect to the circumferential direction of the rim (or at most 45° with respect to the axial direction of the rim). Thus, the ring may be one which is obtained by winding filaments at an angle of between 45° to 10° with respect to the axial direction of the rim. Alternatively, the ring may be a combination of fibers extending in the axial direction and fibers wound in the circumferential direction, or may be a combination of a woven sheet and fibers wound in the circumferential direction.

Because of the function of the rim, it is essential to coaxially join the two flange and bead seat parts 3 and 4. For this purpose, the inside diameter of the ring 5 is preferably made smaller by 0.1 to 0.2 mm than the outside diameter of the flange and bead seat parts which are to be welded together, and, after adhesive is applied to the welding surfaces of the flange and bead seat parts 3 and 4 and the ring 5, these parts 3, 4 and 5 are press-fitted together.

According to this method, the right and left flange and bead seat parts 3 and 4 are coaxially welded together and the resultant product could be satisfactorily used as an automobile wheel rim. A margin for the differences in diameter for press-fitting is most preferably 0.1 to 0.2 mm but it will still be satisfctory if it is 0 to 0.5 mm.

As is apparent from the above description, a continuous fiber reinforced plastic rim, which is light and durable, can be readily manufactured according to the invention. Especially, a carbon fiber rim manufactured according to the invention is effective for weight reduction, because it is higher in strength and elasticity than rims made of other fibers while still being very lightweight. Furthermore, according to the invention, rims can be manufactured by combining at least two kinds of fibers. Examples of the combination of fibers are a combination of carbon fiber and glass fiber, and a combination of carbon fiber and Kevlar fiber.

What is claimed is:

1. A method of manufacturing a continuous fiber reinforced plastic wheel rim for automobiles, motorcycles, or the like, said rim being of the type including a central portion, first and second flange portions adjacent said central portion on either side thereof and first and second bead seat portions adjacent said first and second flange portions, respectively, said method comprising the steps of:

forming a first rim half including said first bead seat portion, said first flange portion and a first part of said central portion and a second rim half including said second bead seat portion, said second flange and a second part of said central portion, each of said first and second rim halves comprising a continuous fiber reinforced plastic;

forming a ring of continuous fiber reinforced plastic; and adhesively bonding said first and second rim halves together with said ring to form said wheel rim; wherein said step of forming said first and second rim halves comprises laying a plurality of resin impregnated sheets on one another, each of said sheets having continuous fibers running in at least one direction and the sheets being laid with their continuous fibers running in directions angularly offset with respect to one another so that the said continuous fibers are isotropic around the circumference of the rim and pressing said sheets to form said rim halves.

2. A method as claimed in claim 1, wherein each of said rim halves after pressing has a volumetric fiber content of 50% to 70%.

3. A method as claimed in claim 1, wherein said plurality of sheets comprises at least a first long fiber sheet forming a first surface of said rim and at least a second long fiber sheet forming a second surface of said rim, said plurality of sheets further comprising laminated materials such as short fibers, discontinuous woven sheets or partially cut woven sheets forming an intermediate layer between said at least first and second long fiber sheets.

4. A method as claimed in claim 1, wherein said plurality of sheets comprises n sheets ($n \geq 4$) having their fiber running directions angularly offset by substantially $\pi/n$ radians.

5. A method as claimed in claim 1, wherein said plurality of sheets comprises n sheets ($n \geq 2$) each having fibers running in at least first and second orthogonal directions and having their fiber running directions angularly offset by substantially $\pi/2n$ radians.

6. A method as claimed in claim 1, in which said first and second rim halves are welded together through said ring by applying an adhesive to the welding surfaces and then press-fitting.

7. A method as claimed in claim 6, wherein said rim halves each have an outside diameter at their central portion parts which is larger than the inside diameter of said ring by 0.1 to 0.2 mm.

8. A method as claimed in claim 1, in which said fiber reinforced plastic is carbon fiber reinforced plastic.

9. A method as claimed in claim 1, in which said fiber reinforced plastic is made of at least two kinds of fiber reinforced plastic.

10. A method as claimed in claim 1, wherein said ring forming step comprises winding a continuous filament at an angle of less than 45° with respect to the axial direction of said ring.

11. A method as claimed in claim 1, wherein said ring forming step comprises combining fibers extending substantially in the axial direction of said ring with fibers wound in the circumferential direction of said ring.

12. A method as claimed in claim 1, wherein said ring forming step comprises combining woven fiber fabric with fibers wound in the circumferential direction of said ring.

* * * * *